United States Patent [19]

Barreiro et al.

[11] 4,258,012
[45] Mar. 24, 1981

[54] METHOD OF PURIFYING URANIUM TETRAFLUORIDE HYDRATE AND PREPARING URANIUM (VI) PEROXIDE HYDRATE USING A FLUORIDE COMPLEXING AGENT

[75] Inventors: Agustin J. Barreiro, Tampa; Charles M. T. Lowe, St. Petersburg; JoAnne LeFever, Brandon; Ronald L. Pyman, Tampa, all of Fla.

[73] Assignee: Gardinier, Inc., Tampa, Fla.

[21] Appl. No.: 919,558

[22] Filed: Jun. 27, 1978

[51] Int. Cl.³ .......................................... C01G 43/01
[52] U.S. Cl. .................................. 423/8; 423/16; 423/253; 423/260
[58] Field of Search ............ 423/16, 253, 260, 8, 423/253

[56] References Cited

U.S. PATENT DOCUMENTS

| | | | |
|---|---|---|---|
| 2,733,127 | 1/1956 | Spiegler | 423/16 |
| 2,770,521 | 11/1956 | Spiegler | 423/16 |
| 2,847,277 | 8/1958 | King et al. | 423/16 |
| 3,037,840 | 6/1962 | Gregory, Jr. et al. | 423/260 |

OTHER PUBLICATIONS

Bruce, F., et al., Eds., *Progress in Nuclear Chemistry, Series III, Process Chemistry*, Pergammon Press, N.Y. 1956, p. 20.
Grainger, L. *Uranium and Thorium*, George Newnes Limited, London, 1958, pp. 31-32.
Katz, J. et al., *The Chemistry of Uranium*, Part I, McGraw-Hill Book Company, Inc., New York, 1951, p. 375.

*Primary Examiner*—Deborah L. Kyle
*Attorney, Agent, or Firm*—Cushman, Darby & Cushman

[57] ABSTRACT

A method of preparing uranium (VI) peroxide hydrate from uranium tetrafluoride hydrate, comprising the steps of digesting uranium tetrafluoride hydrate in an aqueous acid in the presence of a fluoride complexing agent to produce an aqueous uranium solution, adjusting the aqueous uranium solution to a pH between about 1 to about 3, filtering the aqueous uranium solution to remove undissolved material, reacting the aqueous uranium solution with peroxide to precipitate uranium (VI) peroxide hydrate, and separating the precipitated uranium (VI) peroxide hydrate.

15 Claims, 2 Drawing Figures

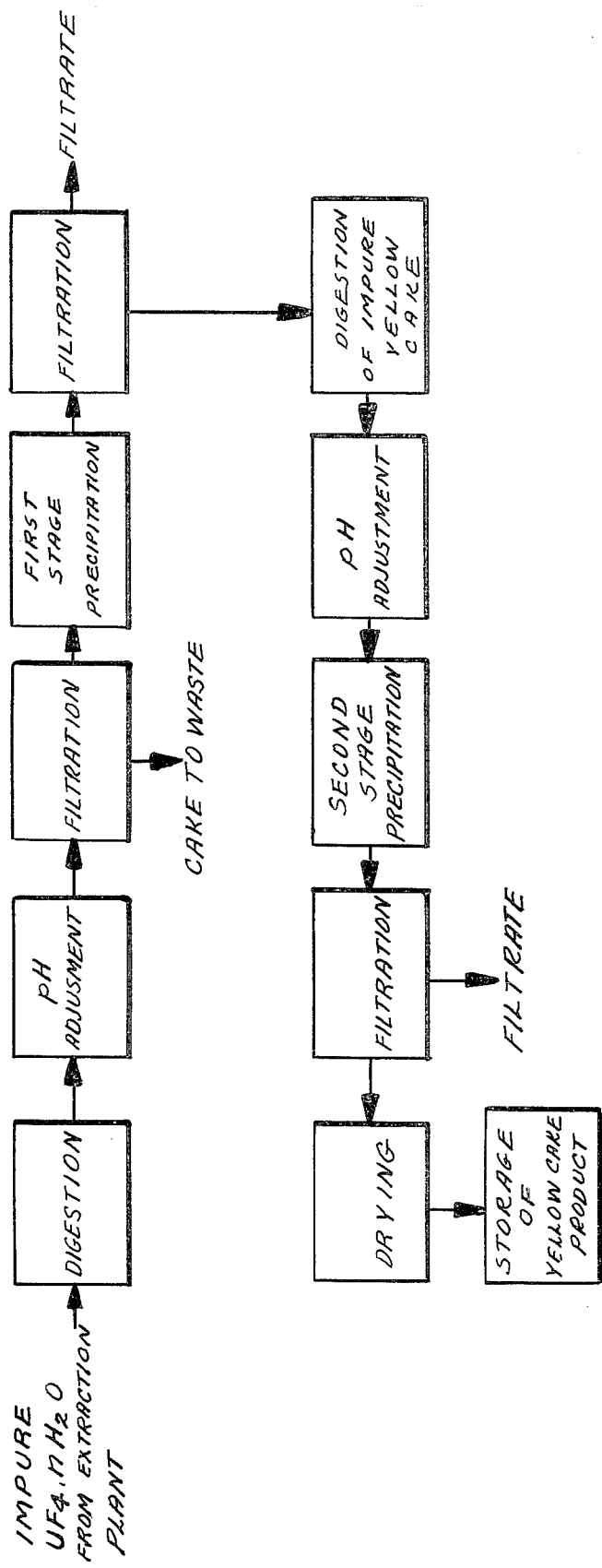

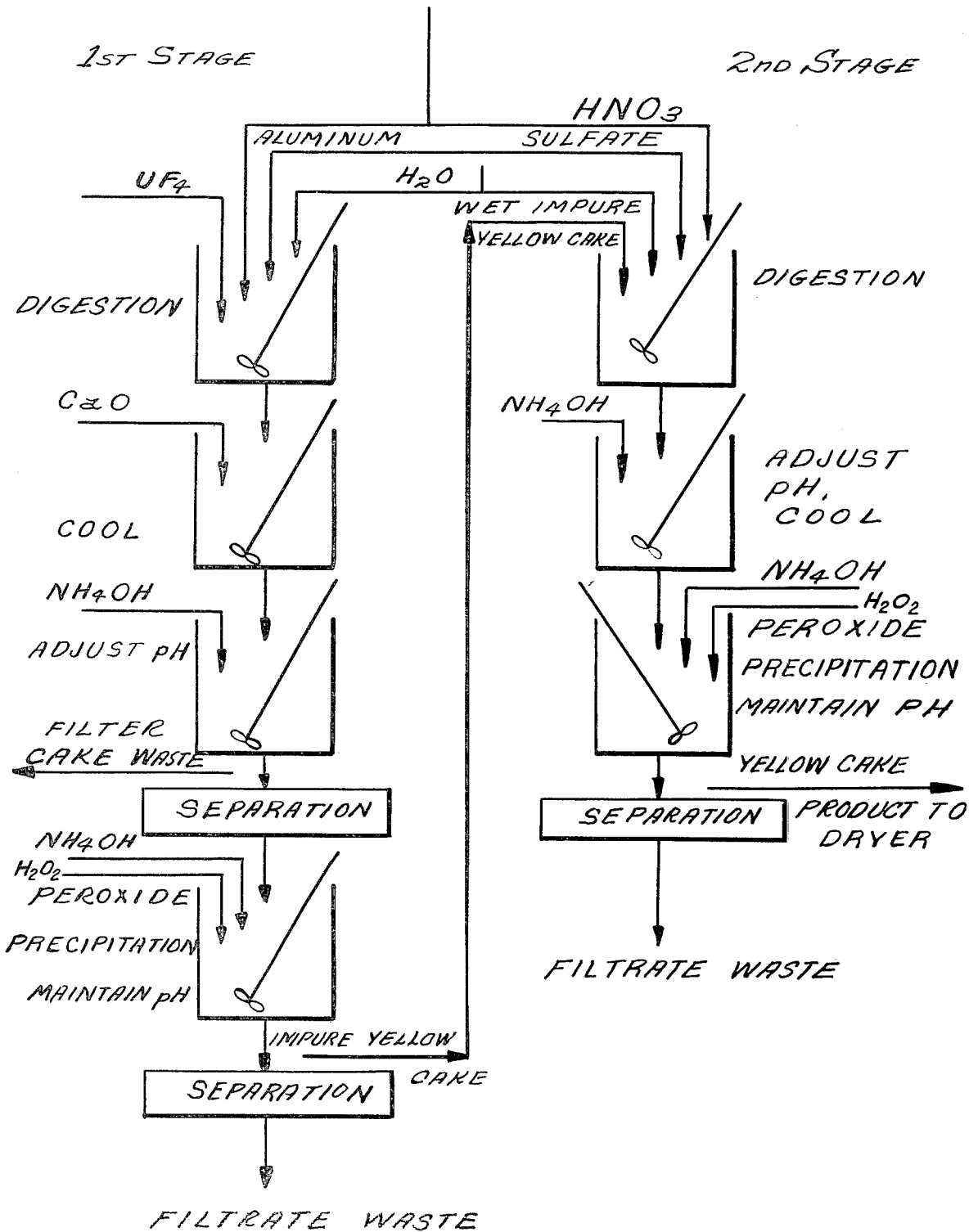

METHOD OF PURIFYING URANIUM TETRAFLUORIDE HYDRATE AND PREPARING URANIUM (VI) PEROXIDE HYDRATE USING A FLUORIDE COMPLEXING AGENT

BACKGROUND OF THE INVENTION

The recovery of uranium from wet-process phosphoric acid has been the subject of prior study. Most marine phosphate rock contains from about 0.2 to 0.4 pounds of uranium per ton. Thus, the annual production of phosphate rock, on the order of about 30–40 million tons yearly, represents several million pounds of uranium. In the United States, both the Florida and Carolina phosphate deposits contain appreciable uranium.

In the wet process for producing phosphoric acid, phosphate rock is treated with sulfuric acid, thereby precipitating calcium sulfate and releasing phosphoric acid. It has been found that nearly all of the uranium contained in the phosphate rock is dissolved by sulfuric acid, and that the filtrate of the crude phosphoric acid contains from about 70% to about 90% of the uranium in the original phosphate rock.

To recover the minute uranium content of the crude wet-process phosphoric acid requires special processing techniques. These techniques are generally described in the *Kirk-Othmer Encyclopedia of Chemical Technology, Second Edition,* volume 21, pages 1 to 36, which are hereby incorporated by reference. One technique for recovering uranium from crude wet-process phosphoric acid is solvent extraction. Recovery of uranium from crude phosphoric acid by solvent extraction requires a solvent which is immiscible with water and which has a high affinity for uranium. These solvents extract uranium from crude phosphoric acid by the formation of a complex with the uranium which is soluble in excess solvent.

After separation of the uranium-laden or "pregnant" solvent from the phosphoric acid, the solvent is contacted with hydrofluoric acid to precipitate the uranium in the form of impure uranium tetrafluoride hydrate, $UF_4 \cdot nH_2O$, which is removed from the solvent hydrofluoric acid mixture by means of a centrifuge. Because of its impurity content, the resulting $UF_4 \cdot nH_2O$ is not suitable for direct conversion to $UF_6$ and must be first purified to produce a uranium product meeting "yellow cake" standards.

Prior processes to purify uranium tetrafluoride hydrate, $UF_4 \cdot nH_2O$, include for example, digestion of the crude uranium tetrafluoride hydrate in hot concentrated sodium hydroxide solution, followed by filtration and washing. It has been found that in order to consistently meet the standards of purity required for the production of "yellow cake" a large excess of sodium hydroxide or multiple digestions are required to digest the uranium tetrafluoride in the initial step of the process. In addition, filtration of the solution after digestion in concentrated sodium hydroxide is difficult and requires considerable filter area. This increases the cost of equipment and the operating cost of the described process.

The present invention provides a new process of purifying uranium tetrafluoride hydrate to produce a uranium (VI) peroxide product meeting "yellow cake" specifications which is economically attractive, especially when compared to the prior art process described above. Yellow cake specifications are issued by uranium refineries and specify the maximum impurity levels which a refinery will accept in their refinery feedstock. For example, yellow cake specifications issued by the Ker-McGee refinery specify a maximum fluoride level of 0.15% based on the weight of the uranium. Maximum levels of other impurities, each based on the weight of uranium in the feedstock, include iron, 1.00%; calcium 1.00%; and magnesium, 0.50%.

SUMMARY OF THE INVENTION

Briefly, in accordance with the invention, a process of purifying uranium tetrafluoride hydrate to produce a uranium (VI) peroxide product meeting "yellow cake" standards has been found using a double precipitation procedure. In the process of the invention, uranium tetrafluoride hydrate is first digested in acid solution together with a fluoride complexing agent to produce an aqueous uranium solution. The pH of the aqueous uranium solution is raised to between about 1 and about 3, and the aqueous uranium solution is filtered to remove any undissolved impurities. The aqueous uranium solution is then treated with hydrogen peroxide to precipitate uranium (VI) peroxide, which is separated by filtration or centrifugation. In the second stage of the process the uranium (VI) peroxide of the first stage is digested in an acid solution to which a fluoride complexing agent has been added to produce an aqueous uranium (VI) solution. The pH of the aqueous solution is again adjusted to between 1 and 3, and the aqueous uranium (VI) solution is treated with hydrogen peroxide to precipitate uranium (VI) peroxide, which is again separated by filtration or centrifugation, and dried. It is found that the uranium (VI) peroxide obtained from the second stage of the process is sufficiently pure to meet "yellow cake" specifications.

BRIEF DESCRIPTION OF THE DRAWING

FIG. 1 is a flow diagram of a preferred embodiment of the invention. Impure uranium tetrafluoride hydrate, $UF_4 \cdot nH_2O$, is digested in an acid solution containing a fluoride complexing agent. The pH of the resulting aqueous uranium solution is adjusted and the aqueous uranium solution is filtered to remove any undissolved impurities. In the first stage precipitation, the aqueous uranium solution is treated with peroxide to precipitate uranium (VI) peroxide. The precipitate is separated, and redigested in an acid solution containing a fluoride complexing agent. The pH of the resulting aqueous uranium solution is adjusted, and uranium (VI) peroxide is again precipitated by the addition of peroxide. The uranium (VI) peroxide product, which meets "yellow cake" specification, is separated and dried.

FIG. 2 illustrates a preferred embodiment of the present invention in which the complexing agent is aluminum sulfate. Subsequent to digestion the sulfate anions are removed from the aqueous uranium solution by precipitation as an insoluble sulfate, viz., calcium sulfate.

While the invention will be described in connection with a preferred procedure, it will be understood that it is not intended to limit the invention to that procedure. On the contrary, it is intended to cover all alternatives, modifications and equivalents included within the scope of the invention as defined by the claims.

DETAILED DESCRIPTION OF THE INVENTION

A preferred embodiment of the present invention will be discussed with reference to the drawings. In the first step of the process impure uranium tetrafluoride hydrate is digested in an acid solution in the presence of a fluoride complexing agent. Nitric acid is preferred for use in this digestion, and for example, 55% to 70% nitric acid may be used. It is desirable that the acid solution be stirred to promote digestion. It is also desirable that the digestion take place at an elevated temperature, e.g., between about 90° C. and 120° C. It is preferred to use more than a stoichiometric amount of nitric acid with reference to the following unbalanced equation:

$$UF_4 + 2HNO_3 \rightarrow UO_2^{2+} + 2(NO_3^-). \tag{1}$$

For example, it is preferred to use at least 2 to 3 times the stoichiometric amount of nitric acid based on the above equation. The purpose of the fluoride complexing agent is to complex the fluoride ions when the uranium tetrafluoride is digested and keep them in solution when the uranium peroxide is precipitated. Any compound which forms a soluble complex with fluoride ions may be used. For example, aluminum or boron compounds may be used as the fluoride complexing agent. Suitable aluminum compounds include aluminum chloride, aluminum nitrate, aluminum oxide or hydroxide, or aluminum sulfate, as well as other aluminum compounds capable of forming an aluminum fluoride complex, viz. $AlF_6^{3-}$, in acid solution. Of these aluminum hydroxide or aluminum sulfate are preferred complexing agents. Suitable boron compounds include boric acid, as well as other boron compounds capable of forming boron-fluoride complexes in acid solution. It is preferred to use an excess, i.e., more than stoichiometric amount, of fluoride complexing agent.

The fluoride complexing agent selected to complex and scavenger the fluoride ions in either the first or second steps of purification must be chosen with due regard to its possible effect on the subsequent precipitation of uranium (VI) peroxide. For example, if aluminum sulfate, $Al_2(SO_4)_3$, is selected it is necessary to remove the sulfate ions before precipitating uranium (VI) peroxide. Large concentrations of sulfate ions in the aqueous uranium solution would otherwise interfere with the precipitation of the uranium (VI) peroxide. If aluminum sulfate is selected as the fluoride complexing agent, the sulfate ions must be removed from the solution, for example by precipitation as an insoluble sulfate. A preferred reagent to remove sulfate anions is calcium oxide, which forms insoluble calcium sulfate. For example, a stoichiometric amount of calcium oxide may be added to the aqueous uranium solution to precipitate sulfate anions.

In the next step of the process, the reaction solution is cooled, e.g., to about 40° C., and the pH is increased to about 1 to about 3. As used in the present specification, a pH of about 1 to about 3 includes a pH from 0.5 to a pH of 3.5. It is preferred to increase the pH of the cooled reaction solution to about 2. For example, ammonium hydroxide may be used to raise the pH of the aqueous uranium solution.

The cooled slurry at a pH between about 1 and about 3 is filtered to remove the calcium sulfate precipitate, if present, as well as any undissolved impurities. The filter cake is washed with a small amount of water, which is added to the filtrate. Thereafter, the filter cake is discarded.

The aqueous uranium solution is then treated with peroxide to precipitate uranium (VI) peroxide, while at the same time maintaining the pH. Hydrogen peroxide is a preferred peroxide for use in the present invention. It is preferred to use an excess amount of hydrogen peroxide, for example about 1.15 to 2 times the stoichiometric amount of hydrogen peroxide based on the following equation:

$$UO_2^{2+} + H_2O_2 + 2H_2O \rightarrow UO_4.2H_2O + 2H^+. \tag{2}$$

The aqueous uranium solution is stirred during and after the addition of the peroxide to ensure full precipitation of uranium (VI) peroxide. For example, the aqueous uranium solution may be stirred for one hour after the addition of the peroxide to ensure full precipitation.

The reaction mixture is then filtered or centrifuged and the yellow uranium (VI) peroxide precipitate is washed with water. The yellow uranium (VI) peroxide precipitate is commonly called "yellow cake" when it meets established standards of purity. The filtrate from the separation is discarded. The wet uranium (VI) peroxide filter cake generally contains approximately 0.5% to approximately 1.0% by weight fluorine.

In most cases, the wet uranium (VI) peroxide filter cake goes to a second stage of purification. However, it is an aspect of the present invention that depending upon the type, and amount, of impurities present in the uranium tetrafluoride hydrate starting material, the second purification stage may be omitted. That is, depending upon the type, and amount, of impurities present in the starting material, the uranium (VI) peroxide product of the first purification stage may meet "yellow cake" specifications, and be used without further purification.

The second stage of purification, if necessary to obtain a product meeting "yellow cake" specifications, proceeds in a manner parallel to the first stage of purification. In the second stage, the wet uranium (VI) peroxide product of the first stage is dissolved again in an acid mixture in the presence of a fluoride complexing agent. The digestion again desirably takes place with stirring at an elevated temperature. In the digestion step of the second stage of purification it is again preferred that the acid used be nitric acid, containing for example 55% to 70% by weight $HNO_3$. The fluoride complexing agent may be chosen from any of the above-discussed fluoride complexing agents, although aluminum sulfate is preferred in the second purification stage.

In this second stage of purification, it is desirable that the acid used to digest the uranium (VI) peroxide be present in excess. For example, if nitric acid is used, preferably, at least twice the stoichiometric amount needed to form uranyl nitrate $UO_2(NO_3)_2$ is present. It is again preferred to use an excess of fluoride complexing agent. Indeed, a large excess of fluoride complexing agent is preferred. For example, it is preferred to use at least 8 times the stoichiometric amount of fluoride complexing agent necessary to complex the fluorine remaining in the reaction mixture. However, because the fluoride ion concentration in the reaction mixture in the second stage of purification is far less than the first stage, a much smaller amount of fluoride complexing agent need be used. In the first stage of purification, the fluoride ion level of the impure uranium tetrafluoride being digested is in the range from about 20% to about 25% by weight. In sharp contrast, the fluoride ion level of the impure "yellow cake" being digested in the second stage of purification is only about 1% by weight. At these low concentrations of fluoride ion, even an eight-fold excess of aluminum sulfate will not introduce objectionally large amounts of sulfate ions into the reaction mixture. Therefore, in the second stage of purification it is not necessary to remove sulfate ions from the aqueous uranium solution following digestion. The aqueous uranium solution may however be filtered after digestion if desired.

After the uranium (VI) peroxide is digested in the acid solution in the presence of a fluoride complexing agent, the solution is cooled, preferably below 40° C. and the pH is raised with an alkaline reagent to between about 1 and about 3. A preferred alkaline reagent used to raise the pH of the reaction solution is ammonium hydroxide.

Thereafter, the aqueous uranium solution is treated with an excess of peroxide, with stirring, while maintaining the pH of the solution between about 1 and about 3. A preferred peroxide is hydrogen peroxide. It is desirable to use between about 1.15 to 2 times the stoichiometric amount of hydrogen peroxide required according to Equation 2 to form the uranium (VI) peroxide precipitate. The resulting slurry is agitated for at least one hour to ensure full precipitation of uranium (VI) peroxide. The reaction mixture is then filtered or centrifuged, and the filter cake, which constitutes the purified product, is washed with a small amount of water and dried. The filtrate, together with the wash water, may be recovered and used as dilution water in the first stage of the purification process. It is found that the purified "yellow cake" product contains between about 97% and about 99% by weight of the uranium in the original starting material.

EXAMPLES

The process of the present invention will be illustrated by three Examples. In the first Example, impure uranium tetrafluoride hydrate was digested in the first stage of purification in 55% nitric acid in the presence of aluminum sulfate at a temperature of 105° C. by stirring the reactants together for approximately 15 minutes. Three times the stoichiometric amount of nitric acid necessary according to Equation 1 to form uranyl nitrate was used. The amount of aluminum sulfate used was two times the stoichiometric amount necessary to complex the fluoride in the starting material as $AlF_6^{3-}$.

Next, the sulfate ions contained in the solution were precipitated as calcium sulfate by adding a stoichiometric amount of calcium oxide, CaO. The slurry was then cooled to less than 40° C. and pH was raised to pH 2 by the addition of ammonium hydroxide.

The slurry was filtered to remove the precipitated calcium sulfate, and any undissolved impurities, and the filter cake was washed with a volume of water equal to the original volume of slurry, the wash water being combined with the filtrate. The filter cake was then discarded.

The filtrate and wash water containing uranium were combined in a stirred vessel with twice the stoichiometric amount of hydrogen peroxide needed to form uranium (VI) peroxide while maintaining the pH at 2 by the addition of ammonium hydroxide. The reaction mixture was stirred for more than an hour after all of the hydrogen peroxide had been added to ensure full precipitation of uranium (VI) peroxide, and then filtered.

The filtrate from the above filtration was discarded and the wet uranium (VI) peroxide filter cake was subjected to the second stage of purification. It was found that the wet uranium (VI) peroxide filter cake contained approximately 0.5 to 1.0% fluoride.

In the second stage of purification the wet uranium (VI) peroxide filter cake was dissolved in a mixture of 55% nitric acid and aluminum sulfate at a temperature of 105° C. The reaction mixture was stirred for approximately 15 minutes. Twice the stoichiometric amount of nitric acid needed according to Equation 1 to form uranyl nitrate was used, while the amount of aluminum sulfate was eight times the stoichiometric amount needed to complex the fluoride in the uranium (VI) peroxide as $AlF_6^{3-}$.

After the uranium (VI) peroxide filter cake dissolved in the acid solution, the solution was cooled to below 40° C. and adjusted to pH 2 by the addition of ammonium hydroxide. As in the first stage, the uranium was precipitated from this solution by adding twice the stoichiometric amount according to Equation 2 of hydrogen peroxide needed to ensure full precipitation of the uranium as uranium (VI) peroxide, while maintaining the solution at pH 2 by the addition of ammonium hydroxide.

The resulting slurry was agitated for over an hour, filtered and the filter cake, which was the purified "yellow cake" product, was dried at 105° C. The filtrate was collected for use as dilution water in the first stage of the purification process. It was found that the uranium in the purified "yellow cake" product constituted 96.94% of the uranium in the original uranium tetrafluoride hydrate starting material.

The product of this Example was analyzed and found to contain (by weight) 79.25% $U_3O_8$; 0.09% F; 0.01% CaO, 0.01% MgO; 0.04% $Al_2O_3$ and 0.38% $Fe_2O_3$. This product satisfied all of the yellow cake standards set forth below.

The Example was repeated twice using the same stoichiometric ratios of aluminum sulfate and calcium oxide in both the first and second stages of precipitation, but varying the stoichiometric excess of nitric acid used. The consumption of reagents in the three Examples may be compared as follows:

| Reagent | Example: | Stoichiometric Ratio | | |
|---|---|---|---|---|
| | | 1 | 2 | 3 |
| 55% $HNO_3$ | 1st stage | 3x | 3x | 2x |
| | 2nd stage | 2x | 1.5x | 1x |
| $Al_2(SO_4)_3 \cdot 18H_2O$ | 1st stage | 2x | 2x | 2x |
| | 2nd stage | 8x | 8x | 8x |
| CaO | 1st stage | 1x | 1x | 1x |

The products of the second and third Examples were analyzed and found to contain by weight:

| Example | 2 | 3 |
|---|---|---|
| $U_3O_8$ | 81.14 | 81.63 |
| F | 0.07 | 0.09 |
| CaO | 0.01 | 0.03 |
| MgO | 0.01 | 0.02 |
| $Al_2O_3$ | 0.05 | 0.08 |
| $Fe_2O_3$ | 0.58 | 0.09 |

The products of each of the three Examples were found to satisfy the yellow cake standards set forth below. A comparison of the yellow cake standards and each of the three products is set forth below:

|  | Limits | Examples | | |
|---|---|---|---|---|
|  |  | 1 | 2 | 3 |
| U | 62.50% min. | 67.22 | 68.82 | 69.24 |
| F (uranium basis) | 0.15% max. | 0.13 | 0.10 | 0.13 |
| Ca (uranium basis) | 1.00% max. | 0.01 | 0.01 | 0.03 |
| Mg (uranium basis) | 0.50% max. | 0.01 | 0.01 | 0.02 |
| Al (uranium basis) | — | 0.03 | 0.04 | 0.06 |
| Fe (uranium basis) | 1.00% max. | 0.40 | 0.59 | 0.09 |

Thus, it is apparent that there has been provided, in accordance with the invention, a method of purifying uranium tetrafluoride hydrate that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the following claims.

We claim:

1. A method of preparing uranium (VI) peroxide hydrate from uranium tetrafluoride hydrate, comprising the steps of:
   (a) digesting uranium tetrafluoride hydrate in an aqueous acid solution in the presence of a fluoride complexing agent to produce an aqueous uranium solution,
   (b) adjusting the aqueous uranium solution of step (a) to a pH between about 1 to about 3,
   (c) filtering the aqueous uranium solution of step (b) to remove any undissolved material,
   (d) reacting the aqueous uranium solution of step (c) with peroxide to precipitate uranium (VI) peroxide hydrate,
   (e) separating the precipitated uranium (VI) peroxide hydrate of step (d),
   (f) digesting the uranium (VI) peroxide hydrate of step (e) in an aqueous acid in the presence of a fluoride complexing agent to produce an aqueous uranium solution,
   (g) adjusting the aqueous uranium solution of step (f) to a pH between about 1 to about 3,
   (h) reacting the aqueous uranium solution of step (g) with peroxide to precipitate uranium (VI) peroxide hydrate, and
   (i) separating the precipitated uranium (VI) peroxide hydrate of step (h).

2. A method according to claim 1 wherein the aqueous acid is nitric acid.

3. A method according to claim 1 wherein the fluoride complexing agent is an aluminum compound.

4. A method according to claim 1 wherein the peroxide is hydrogen peroxide.

5. A method according to claim 1 including maintaining the aqueous uranium solution at a pH between about 1 to about 3 during the filtration of step (c), the reaction of step (d) and the reaction of step (h).

6. A method according to claim 1 including the step of filtering the aqueous uranium solution of step (f) to remove undissolved material prior to adjusting the pH of said aqueous uranium solution in step (g).

7. A method of preparing uranium (VI) peroxide hydrate from uranium tetrafluoride hydrate, comprising the steps of:
   (a) digesting uranium tetrafluoride hydrate in an aqueous acid solution in the presence of a fluoride complexing agent to produce an aqueous uranium solution,
   (b) adjusting the aqueous uranium solution of step (a) to a pH between about 1 to about 3,
   (c) filtering the aqueous uranium solution of step (b) to remove undissolved material,
   (d) reacting the aqueous uranium solution of step (c) with peroxide to precipitate uranium (VI) peroxide hydrate, and
   (e) separating the precipitated uranium (VI) peroxide hydrate of step (d).

8. A method according to claim 7 wherein the aqueous acid is nitric acid.

9. A method according to claim 8, wherein said nitric acid is 55% to 70% nitric acid and wherein about 2 to about 3 times the stoichiometric amount of nitric acid is used in said digesting step (a) based on the following equation:

$$UF_4 + 2HNO_3 \rightarrow UO_2^{2+} + 2(NO_3^-).$$

10. A method according to claim 7 wherein the fluoride complexing agent is an aluminum compound.

11. A method according to claim 10, wherein said aluminum compound is aluminum sulfate and sulfate ions remaining in solution after the digestion step (a) are removed before the step (d) precipitation of uranium (VI) peroxide.

12. A method according to claim 11, wherein said sulfate ions are removed by adding to the solution a stoichiometric amount of calcium oxide prior to step (b).

13. A method according to claim 7 wherein the peroxide is hydrogen peroxide.

14. A method of preparing uranium (VI) peroxide hydrate from uranium tetrafluoride hydrate, comprising the steps of:
   (a) digesting an impure uranium-containing compound in a nitric acid solution in the presence of a fluoride complexing agent to produce an aqueous uranium solution, wherein said uranium-containing compound consists essentially of uranium tetrafluoride hydrate,
   (b) adjusting the aqueous uranium solution of step (a) to a pH between about 1 to about 3,
   (c) filtering the aqueous uranium solution of step (b) to remove any undissolved material,
   (d) reacting the aqueous uranium solution of step (c) with peroxide to precipitate uranium (VI) peroxide hydrate,
   (e) separating the precipitated uranium (VI) peroxide hydrate of step (d),
   (f) digesting the uranium (VI) peroxide hydrate of step (e) in nitric acid in the presence of a fluoride complexing agent to produce an aqueous uranium solution,
   (g) adjusting the aqueous uranium solution of step (f) to a pH between about 1 to about 3,
   (h) reacting the aqueous uranium solution of step (g) with peroxide to precipitate uranium (VI) peroxide hydrate, and
   (i) separating the precipitated uranium (VI) peroxide hydrate of step (h), whereby a purified uranium (VI) peroxide hydrate containing no more than 0.15% fluoride based on the weight of uranium is produced.

15. A method of preparing a purified uranium (VI) peroxide hydrate from phosphate rock, said method comprising the steps of:
    (a) treating phosphate rock with sulfuric acid, whereby calcium sulfate is precipitated and phosphoric acid containing dissolved uranium is released;
    (b) extracting uranium from said phosphoric acid with a solvent which is immiscible with water and which has a high affinity for uranium;
    (c) separating the uranium-laden solvent of step (b) from said phosphoric acid;
    (d) contacting said uranium-laden solvent of step (c) with hydrofluoric acid to precipitate the uranium in the form of impure uranium tetrafluoride hydrate;
    (e) digesting said impure uranium tetrafluoride hydrate of step (d) in a nitric acid solution in the presence of a fluoride complexing agent to produce an aqueous uranium solution,
    (f) adjusting the aqueous uranium solution of step (e) to a pH between about 1 to about 3,
    (g) filtering the aqueous uranium solution of step (f) to remove any undissolved material,
    (h) reacting the aqueous uranium solution of step (g) with peroxide to precipitate uranium (VI) peroxide hydrate,
    (i) separating the precipitated uranium (VI) peroxide hydrate of step (h),
    (j) digesting the uranium (VI) peroxide hydrate of step (i) in nitric acid in the presence of a fluoride complexing agent to produce an aqueous uranium solution,
    (k) adjusting the aqueous uranium solution of step (j) to a pH between about 1 to about 3,
    (l) reacting the aqueous uranium solution of step (k) with peroxide to precipitate uranium (VI) peroxide hydrate, and
    (m) separating the precipitated uranium (VI) peroxide hydrate of step (l), whereby a purified uranium (VI) peroxide hydrate containing no more than 0.15% fluoride based on the weight of uranium is produced.

* * * * *